Figure 1:
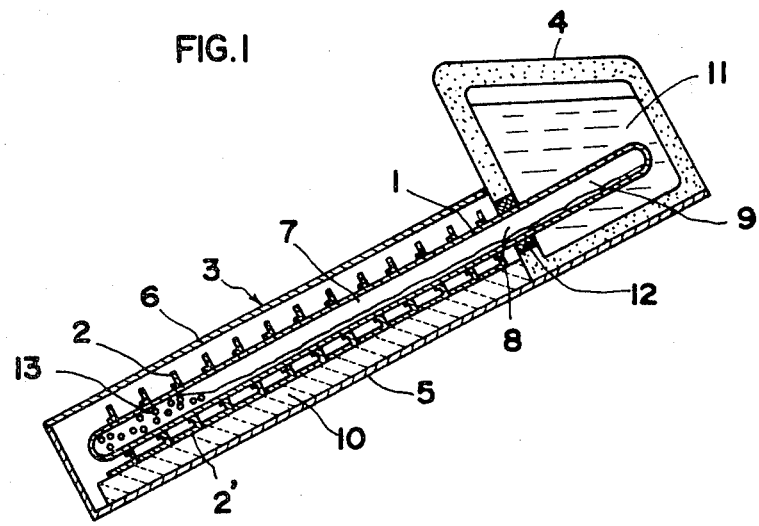

United States Patent [19]

Kitajima et al.

[11] 4,438,759
[45] Mar. 27, 1984

[54] HEAT-PIPE TYPE SOLAR WATER HEATER

[75] Inventors: Soichi Kitajima, Nara; Kazuyuki Iwamura, Ikoma; Yasuhiko Takeda, Nara, all of Japan

[73] Assignee: Matsushita Electric Industrial Co., Ltd., Osaka, Japan

[21] Appl. No.: 329,516

[22] Filed: Dec. 10, 1981

[30] Foreign Application Priority Data

Dec. 24, 1980 [JP] Japan .............. 55-186783[U]
Jan. 30, 1981 [JP] Japan .............. 56-12940[U]

[51] Int. Cl.³ .................................. F24J 3/02
[52] U.S. Cl. .................... 126/433; 126/447; 165/104.21; 165/182
[58] Field of Search ........... 126/433, 442, 443, 438, 126/446, 447; 165/182, 104.19, 104.21, 104.26

[56] References Cited

U.S. PATENT DOCUMENTS

| | | | |
|---|---|---|---|
| 3,889,745 | 6/1975 | Siemonsen | 165/182 |
| 3,915,147 | 10/1975 | Rineer | 126/433 |
| 4,059,093 | 11/1977 | Knowles | 126/433 |
| 4,064,868 | 12/1977 | Nussbaum | |
| 4,083,359 | 4/1978 | Smith | 126/433 |
| 4,088,117 | 5/1978 | Keyes | 165/182 |
| 4,217,882 | 8/1980 | Feldman | 126/433 |
| 4,240,405 | 12/1980 | French | 126/433 |
| 4,306,543 | 12/1981 | Doevenspeck | 126/433 |
| 4,307,712 | 12/1981 | Tracy | 126/443 |

FOREIGN PATENT DOCUMENTS 2902088 9/1979 Fed. Rep. of Germany ...... 126/433

Primary Examiner—Daniel J. O'Connor
Attorney, Agent, or Firm—Joseph W. Farley

[57] ABSTRACT

A heat-pipe type solar collector comprises as its principal portion a plurality of heat pipes arranged in parallel with each other and having vaporizing portions and condensing portions, and a plurality of heat collector plates traversing the heat pipes and arranged in parallel with each other, the vaporizing portion of each heat pipe penetrating through and fixedly mounted to the collector plates in intimate heat conductive relation therewith, and each collector plate having a lower portion bent substantially perpendicular to the remaining portion to cover a space between itself and an adjacent collector plate.

According to this arrangement, solar heat can be effectively collected by the collector plates and transmitted to the heat pipes with a negligible heat loss. Thus the heat collecting efficiency of the water heater can be remarkably enhanced.

5 Claims, 5 Drawing Figures

HEAT-PIPE TYPE SOLAR WATER HEATER

The present invention relates to a heat-pipe type solar water heater in which solar heat is absorbed by a plurality of fin-like heat collector plates and thereafter transferred by heat pipes to a heat exchange tank or a hot water tank to heat a fluid in the tank.

Typical heat-pipe type solar water heaters heretofore used utilize a plurality of flat collector plates each in contact with only one heat pipe. In such water heaters, a high heat collecting efficiency cannot be expected since sunlight, once reflected by the flat collector plates, will scatter away and will never be re-absorbed. Moreover for the reason to be described hereinafter, the contact thermal resistance between the collector plates and the heat pipes becomes inevitably high and thus further lowers the heat collecting efficiency. Still further, since each heat collector plate is associated with only one heat pipe, solar heat collected thereby will not be utilized if the associated heat pipe becomes inoperative by some cause, such as working fluid leakage.

It is therefore an object of the present invention to provide a heat-pipe type solar water heater which, for higher heat collecting efficiency, is provided with heat collector plates capable of re-absorbing reflected solar radiation and connectable to heat pipes in intimate heat conductive relation therewith, and which can maintain a substantially constant overall heat collecting efficiency even if one of the heat pipes becomes inoperative.

In order to fulfil this object, the present invention provides a heat-pipe type solar water heater comprising:

a main housing;

a plurality of heat pipes having vaporizing portions and condensing portions, said vaporizing portions being positioned inside said housing, and said condensing portions projecting out from one end of said housing;

a heat exchange tank mounted to said one end of the main housing for enclosing said condensing portions; and a plurality of heat collector plates arranged inside said min housing in intersecting relation with said heat pipes, the vaporizing portion of each heat pipe penetrating through and fixedly mounted to said collector plates in intimate heat conductive relation therewith, and each collector plate having a lower portion bent substantially perpendicular to the remaining portion to cover a space between itself and an adjacent collector plate.

According to this construction, since the lower portion of each heat collector plate is bent as above, partially reflected sunlight will be re-absorbed by either the bent or unbent portion or by an adjacent collector plate, consequently collecting solar heat to a maximum extent. Further since each heat pipe penetrates the collector plates through holes formed therein, the pipe can be easily brought into intimate contact with the plates by merely expanding it, thus reducing the contact thermal resistance between the pipe and the plates. In case annular flanges are provided integrally with the plates at the penetration holes for increased contact area, the contact thermal resistance will further lower. Moreover since each collector plate is simultaneously in contact with all the heat pipes, the overall heat collecting (transmitting) efficiency will be kept substantially constant even if one of the pipes becomes inoperative by some accident.

According to a preferred embodiment of the invention, the bent portion of each collector plate is arranged with respect to the vaporizing portions of the pipes so that solar radiation reflected by the bent portion tends to directly heat the vaporizing portions from below. This arrangement also enhances the heat collecting efficiency of the water heater.

According to a further preferred embodiment of the present invention, the main housing is slantingly arranged so that said one end of the housing is raised relative to the other end, and the lower portion of each collector plate is bent toward said other end of the housing in a manner such that a small gap is formed between the bent portion and an adjacent collector plate.

With this arrangement, accidentally entering rainwater or condensates formed inside the main housing flow along the collector plates and drain off from these small gaps.

Figure 2:
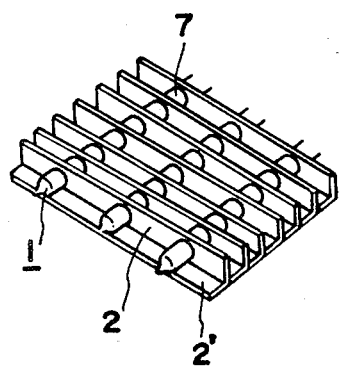
Figure 3:
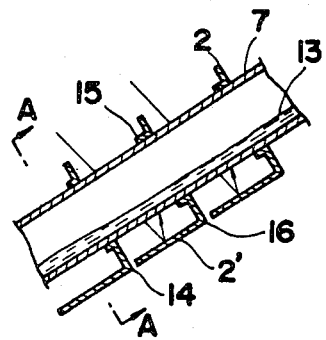
Figure 4:
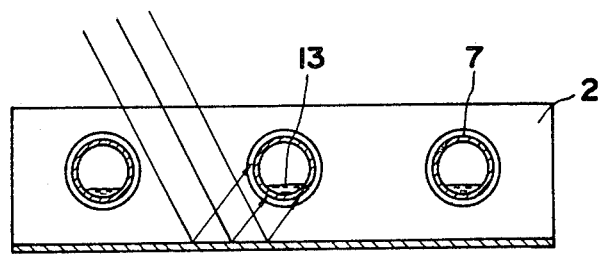
Figure 5:
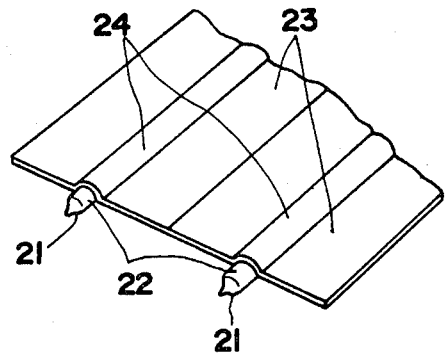

These and other numerous features and effects of the present invention will be readily understood from the description of an embodiment given with reference to the accompanying drawings, in which:

FIG. 1 is a side view in vertical longitudinal section of a solar water heater embodying the invention, FIG. 2 is a perspective view showing the principal portion of the same, FIG. 3 is an enlarged side view in longitudinal section of said principal portion, FIG. 4 is a sectional view taken on the line A—A of FIG. 3, FIG. 5 is a perspective view showing a prior art heat-pipe type solar water heater.

Before describing the present invention, a typical prior art heat-pipe type solar water heater will be briefly explained with reference to FIG. 5.

The solar water heater shown in FIG. 5 comprises as its main portion a plurality of flat heat collector plates 23 connected at their side edges to one another. A heat pipe 21 is attached to each collector plate 23 by fitting the vaporizing portion 22 thereof into a longitudinal recess 24 formed in the plate 23.

With this construction, since the collector plates 23 are flat, sunbeams, once reflected thereon, scatter away into the atmosphere, hence low energy absorption. Further since heat transfer between the plates 23 and the vaporizing portions 22 is effected through small contact surfaces at the recesses 24 and since the contact thermal resistance between the plates 23 and the vaporizing portions 22 becomes invariably high due to insufficient contact therebetween (the fit-in connection of the vaporizing portions 22 with the recesses 24 is always accompanied by some small air gaps at the interface.), the heat transfer efficiency between the two, i.e., the heat collecting efficiency of the water heater, is unavoidably low.

On the other hand, since heat transfer between the collector plates 23 is effected only through small contact surfaces at their side edges and is thus negligibly low, the heat pipes 21 can receive heat only from the corresponding collector plates 23. If, therefore, one of the pipes 21 becomes inoperative by some cause, such as working fluid leakage, the solar heat absorbed by the associated plate 23 will be almost all wasted.

The present invention conceived in view of the above drawbacks will now be fully described with reference to FIGS. 1 to 4.

The heat-pipe type solar water heater shown in FIGS. 1 to 4 generally comprises a plurality of heat pipes 1 arranged parallel with each other, a plurality of heat collector plates 2 disposed parallel with each other and perpendicular to the heat pipes 1, a main housing 3 accommodating the plates 2 and a part of the pipes 1, and a heat exchange tank 4 mounted to one end of the housing 3 and seriving as a hot water tank. The housing 3 comprises a base plate 5 at the bottom and a glass plate 6 at the top for permitting entry of sunlight, and is usually installed slantingly on the roof of a building.

Each heat pipe 1 consists of a vaporizing portion 7 (heat absorbing portion) arranged inside the housing 3, an intermediate heat insulating portion 8, and a condensing portion 9 (heat releasing portion). The vaporizing portion 7 penetrates the collector plates 2 through holes formed therein as shown in FIG. 2 and is kept in intimate heat conductive relation therewith. The vaporizing portion 7 is supported by the base plate 5 through the plates 2 and a heat insulator 10. The condensing portion 9 projects out from the housing 3 into the hot water tank 4 and is immersed in water 11 in the tank for heat-exchange therewith. An annular sealing member 12 is provided between the insulating portion 8 and the tank 4 for the prevention of water leakage. A working fluid 13 is hermetically trapped within the heat pipe 1.

Each collector plate 2 is simultaneously in contact with all the heat pipes 1 (see FIG. 2). As best illustrated in FIG. 3, the plate 2 has a lower portion 2' bent toward the lower end of the main housing 3 and substantially perpendicularly to the unbent portion to cover a space between itself and an adjacent collector plate with a small gap left as at 14. All the bent portions 2' are disposed in the same plne to provide a heat collecting surface which lies below the glass plate 6 throughout substantially all the area thereof.

In operation, sunlight entering through the glass plate 6 is in major part absorbed by the collector plates 2 but at the same time partially reflected thereby. The reflected light is re-absorbed by either the bent or unbent portions or by adjacent collector plates. Thus the plates 2 can absorb almost all inflowing sunlight.

The solar heat thus collected transfers within the collector plates 2 to the contact surfaces between the plates 2 and the vaporizing portions 7 of the pipes 1 and passes on to the working fluid 13 inside the heat pipes 1 with little heat loss due to the contact thermal resistance at the contact surfaces. The working fluid 13 thus boils from the heat received and evaporates. The evolving vapor of the working fluid 13 then transfers inside the heat pipes 1 to the respective condensing portions 9 to heat the water 11 in the tank 4 while itself condensing. The condensed fluid 13 flows down within the pipes 1 to the respective vaporizing portions to repeat the same behavior as above.

In the embodiment described above, the heat pipes 1, before the working fluid 13 is introduced therein, are first provisionally assembled with the collector plates 2 and subsequently expanded to bring the two into intimate heat conductive contact. Thus it is possible to reduce the contact thermal resistance, i.e., heat loss, between the pipes 1 and the plates 2. This contact thermal resistance will be further lowered if the penetration holes of the plates 2 are provided with annular flanges 15 integral with the plates 2.

Each collector plate 2 is in contact with all the heat pipes 1 as described before and as shown in FIG. 2. In this condition, even if one of the heat pipes 1 stops operating as by working fluid leakage, the solar heat collected by the collector plate 2 can be transmitted, with a negligible heat loss, to the water 11 in the tank 4 through the other heat pipes 1 in contact with the plate 2. Thus even at the time of such an accident, the heat collecting efficiency can be maintained essentially constant by an increase in thermal load of each remaining heat pipe.

As illustrated in FIGS. 3 and 4, since solar radiation reflected on the bent portion 2' of each collector plate 2 tends to directly heat the pipes 1 from below, the working fluid 13 condensed in the respective condensing portions 9 and flowing on the bottom surfaces of the pipes 1 will be acceleratedly vaporized, consequently enhancing the heat collecting efficiency of the water heater.

As hereinbefore described, small gaps 14 are formed between the lower ends of the bent portions 2' and adjacent collector plates 2. With this arrangement, accidentally inflowing rainwater or water condensates formed on the collector plates 2 flow downward along the plates 2 and run off from these gaps. The water thus run off is guided by unillustrated water guide grooves formed in the insulator 10 and drained off from the housing 3 through an unillustrated discharge port. Thus such water in no way collects at the corners 16 and corrodes the collector plates 2, thereby assuring an improved durability.

What is claimed is:

1. A heat-pipe type solar water heater comprising:
a main housing;
a plurality of heat pipes arranged longitudinally of said housing and having vaporizing portions and condensing portions, said vaporizing portions being positioned inside said housing and said condensing portions projecting out from one end of said housing;
a heat exchange tank mounted to said one end of said housing for enclosing said condensing portions and
a plurality of heat collector plates arranged inside said housing in intersecting relation with said heat pipes, each heat collector plate having an upper portion formed with holes each provided with an annular flange integral with the collector plate and a lower portion bent substantially perpendicular to said upper portion to cover a space between itself and an adjacent collector plate, the vaporizing portion of each heat pipe penetrating said collector plates through corresponding holes and flanges in intimate fixed and heat conductive contact therewith.

2. A solar water heater as defined in claim 1 wherein said main housing includes a base plate and said vaporizing portions are supported by said base plate through said collector plates, said lower bent portions of said collector plates engaging a heat insulator carried by said base plate.

3. A solar water heater as defined in claim 1 wherein the bent portion of each collector plate is arranged with respect to said vaporizing portions of the pipes so that solar radiation reflected by the bent portion tends to directly heat the vaporizing portions from below.

4. A solar water heater as defined in claim 1 wherein said heat exchange tank is provided in the form of a hot water tank.

5. A solar water heater as defined in claim 1 wherein said main housing is slantingly arranged so that said one end of the housing is raised relative to the other end, the lower portion of each collector plate being bent toward said other end of the main housing in a manner such that a small gap is formed between the bent portion and an adjacent collector plate.

* * * * *